Oct. 24, 1967          E. ZILLMER           3,348,450
          SLIDE-HANDLING STRUCTURE FOR PHOTOGRAPHIC
                PROJECTORS, VIEWERS, AND THE LIKE
Filed Dec. 27, 1965                        4 Sheets-Sheet 1

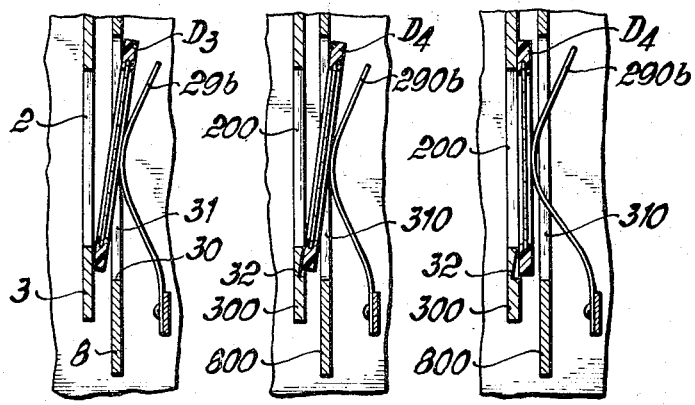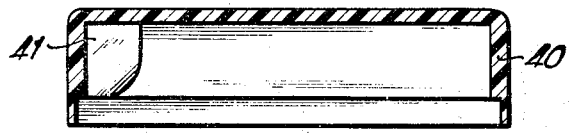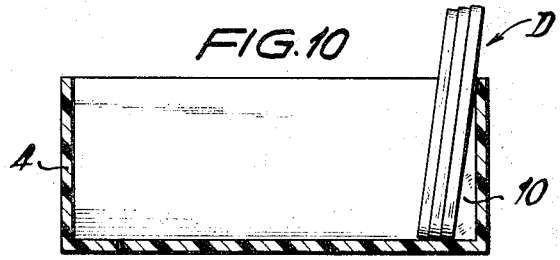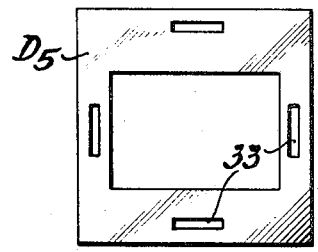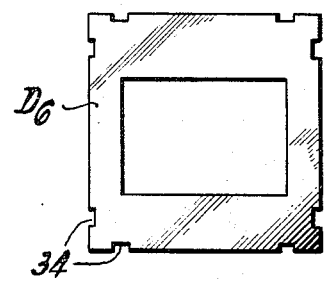

United States Patent Office 3,348,450
Patented Oct. 24, 1967

3,348,450
SLIDE-HANDLING STRUCTURE FOR PHOTO-
GRAPHIC PROJECTORS, VIEWERS, AND
THE LIKE
Erich Zillmer, Braunschweig, Germany, assignor to Voigt-
lander A.G., Braunschweig, Germany, a corporation of
Germany
Filed Dec. 27, 1965, Ser. No. 516,310
Claims priority, application Germany, Jan. 5, 1965,
Z 11,254
16 Claims. (Cl. 88—28)

ABSTRACT OF THE DISCLOSURE

A photographic slide projector for deriving images from slides which are situated in a container one directly next to the other, as distinct from those slide projectors which have magazines provided with partitions which are respectively situated between the slides. The slide projector has a projection plane in which the slides are successively located to successively project images therefrom. A transporting structure is provided for transporting the slides successively from the container in which they are situated directly next to each other to the projection plane, and this transporting structure is situated in advance of the latter plane to engage and transport a slide along a path which is situated in advance of the projection plane to a location where the slide is properly positioned with respect to the optical axis but is situated along the optical axis in advance of the projection plane. The slide is then shifted by a shifting structure of the projector along the optical axis from the transporting structure into the projection plane so that an image can then be projected properly, and finally structure of the projector returns the slide from the image plane to the container from which the slide was originally taken while maintaining the slide in the projection plane during its return movement to the container.

---

The present invention relates to photographic projectors, viewers and the like.

In particular, the present invention relates to a structure for handling slides in devices of this type.

It is conventional with projectors of this type to provide a slide-changing structure which cooperates with slides which are situated in a container in which the slides are maintained separate from each other in suitable compartments defined by partitions or the like in the container. With a slide-container of this latter type it is necessary not only to provide structure for removing a slide from the container and returning it to the container after an image has been projected from the slide, but in addition the slide-container or magazine itself must be advanced in a stepwise manner in synchronism with the removal and replacement of slides. The increment through which the magazine is advanced at each step corresponds to the average distance between a pair of neighboring partitions between which a slide is located. This latter distance will correspond in general to the maximum thickness of a slide which is situated in a frame and which is enclosed in glass.

In practice the manufacture of the color film from which the slides are made, or another company which is in the business of developing the slides from the exposed film will return the developed film in the form of slides which are, according to the wish of the customer or in general, already framed and situated in a simple partitionless container, usually made of a plastic material. The slides are as a rule mounted in glassless frames and therefore have a relatively small thickness. In order to reproduce images from the slides it is necessary for the customer to place the slides properly in a suitable magazine which is capable of being used with his projector.

It is a primary object of the present invention to provide a slide-handling structure which will eliminate to a very large extent inconveniences of the type referred to above by making it possible to use with the projector, viewer, or the like, the slides in the simple, partitionless container in which they are received by the customer.

Thus, it is an object of the invention to provide a slide-changing structure which can take slides one after the other from a simple container of the above type, in which the slides directly engage each other, and which can return the slides to this container while maintaining the original sequential arrangement of the slides and their orientation in the container.

Furthermore, it is an object of the invention to provide a structure of this type which is completely uninfluenced by the particular thickness of the slide, or by any change in the thickness of a given slide.

Moreover, it is an object of the invention to provide a structure of this type which will at the same time automatically advance the magazine in a stepwise manner through an increment corresponding to the thickness of the the last-projected slide.

It is to be understood that while reference is made in the description and claims which follow to a photographic slide projector, this latter term is intended to include not only projectors for projecting images onto a screen, wall or the like, but also viewers capable of being held in the hand or capable of providing an image when resting on a table while the user looks into the viewer.

Primarily with the invention the photographic slide projector has a projection plane in which the slides are to be successively situated for projection of images therefrom. The structure of the invention includes a transporting means which is situated in advance of this projection plane for engaging and transporting a slide along a path which is situated in advance of the projection plane to a location where the slide is properly positioned with respect to the optical axis but is situated along this optical axis in advance of the projection plane. A shifting means of the invention then engages the slide and shifts it along the optical axis into the projection plane so that an image can then be derived properly from the slide. Finally, a return means engages the latter slide, while it remains in the projection plane, and returns it to the slide-container while maintaining the slide in the projection plane during its return movement. Of course, this latter container is a simple container open at one side in which a row of slides are situated directly in engagement with each other, as referred to above.

The invention is illustrated by way of example in the accompanying drawings which form part of the application and in which:

FIG. 6 shows, in a view similar to that of FIGS. 2 and 4 but at a smaller scale and considerably simplified with respect to FIGS. 2 and 4, an intermediate position of a slide during the slide-changing process;

FIGS. 7 and 8 show, also in a simplified sectional side view similar to that of FIG. 6, a special form of the plate against which a slide is situated when located in the projection plane, FIGS. 7 and 8 showing, respectively, two different positions of a slide during the slide-changing process;

FIGS. 9 and 10 show in a longitudinal sectional side view a cover and a slide-container, respectively, with the slides in the latter illustrated in a non-sectional manner; and FIGS. 11 and 12 respectively illustrate different structures of slides.

Figure 1:
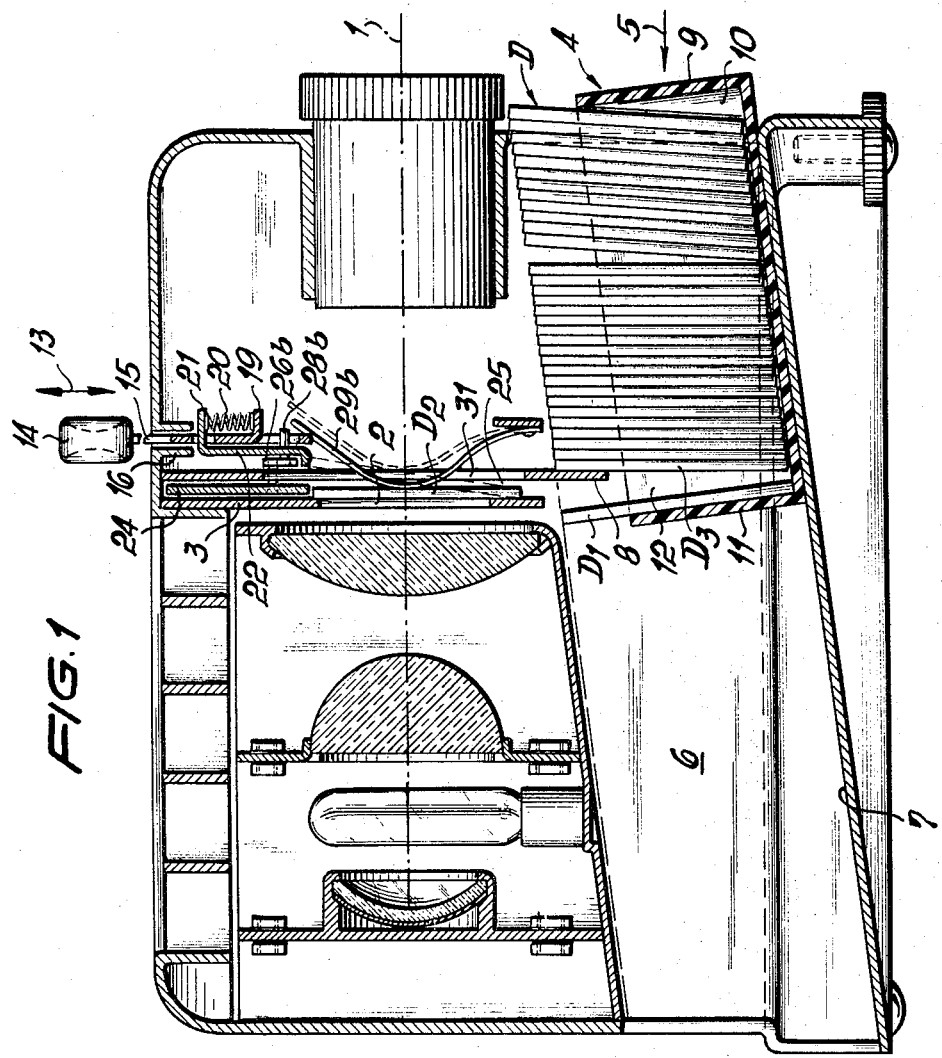
FIG. 1 is a schematic illustration, in a longitudinal sectional view, of a projector provided with the structure of the invention.

There is shown in FIG. 1, in a schematic sectional side view, a projector having the optical axis 1 of the device indicated in a dot-dash line. In the region of this optical axis are situated the conventional optical elements of the device, and these elements are not described in detail since they are conventional. Also, there is a window 2 through which the light beam passes to project an image, this window 2 being formed in an intermediate wall 3 whose front face, the right face of wall 3, as viewed in FIG. 1, determines the projection plane. With the slide-changing mechanism described below the slide which is to be projected is displaced out of a slide-container 4 which has no partitions or the like therein so that the slides directly engage each other in the container 4. The slides are moved to the region of the window 2 and are then returned back to the container 4.

The slide-container 4 is initially introduced in the direction of the arrow 5 into the container guide 6 of the projector, and it rests on the floor 7 which is inclined in the direction in which the container is introduced. The container is moved into the projector to such an extent that the first slide engages an intermediate wall 8 which extends into the region of the guide 6. In this way the slides, which initially extended perpendicularly from the floor of the container 4, are tilted to such an extent that they are now parallel to the intermediate wall 8 and inclined with respect to the floor of the container 4. This condition is provided for those slides shown in FIG. 1 to the right of the intermediate wall 8 and indicated in general by the reference character D which indicates the entire stack of slides. It is possible to provide a greater security in this inclined positioning of the slides by situating at the inner surface of the end wall 9 of the container 4 a wedge-shaped element 10 having an inclined surface of corresponding inclination. After the container has been introduced into the projector in this manner there will be between the inner surface of the end wall 11 of the container and the first slide a wedge-shaped hollow gap 12.

FIG. 1 shows the parts not in their starting position described above but rather in a position in which a slide D1 has already been projected and has been returned to the hollow gap 12 in the container 4. A slide D2 is situated in the projection position in alignment with and next to the window 2, and the next slide D3 which is to be projected is situated in engagement with a face of the intermediate wall 8 which is directed away from the projection plane. As will be apparent from the description below this intermediate wall 8 forms a guide means which guides the slides successively along a predetermined path.

Figure 4:
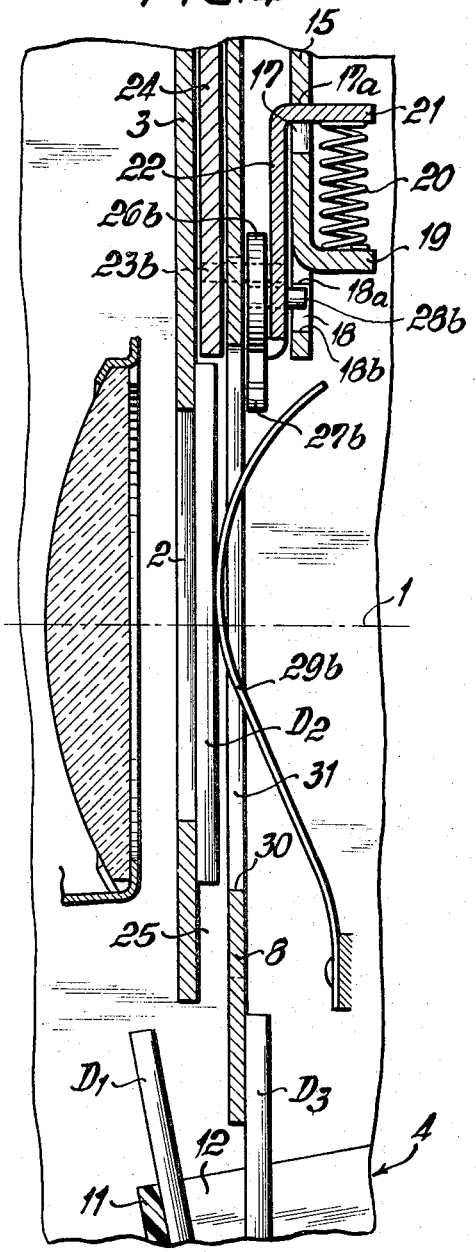
FIG. 4 is a longitudinal sectional elevation in the same plane as FIG. 2 but showing the structure in another position where a slide has been transported out of the magazine and is shifted to the projection plane.

FIG. 4 fragmentarily illustrates the parts in the same position as in FIG. 1 but at a larger scale. For the sake of clarity the slides D themselves are not shown in section but simply in side views.

Figure 2:
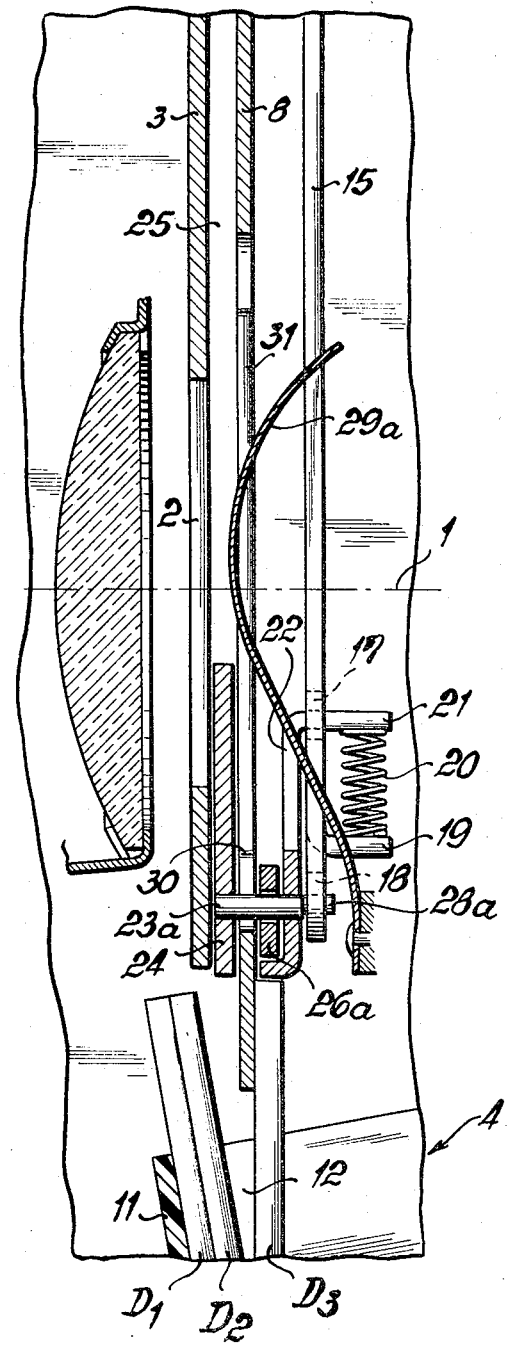
FIG. 2 is a fragmentary sectional view of the structure of the invention taken in the same plane as FIG. 1 but showing the structure on a greatly enlarged scale, as compared to FIG. 1, and in addition showing more details of the structure of the invention, this structure being shown in FIG. 2 in the position it takes when it has just engaged a slide which is about to be projected.

The slide-changing mechanism is provided with a transporting means which includes a handle 14 vertically shiftable in opposed directions as indicated by the arrow 13 in FIG. 1, and this transporting means includes the shiftable plate 15 fixed to the handle 14 to be manually shifted thereby and forming an actuating element for actuating the transporting means. This actuating element 15 is guided for vertical movement in a plane perpendicular to the optical axis 1 by guides 16 fixed to the housing of the projector. The actuating element 15 is formed with an opening 17 and a window 18 beneath the opening 17. In addition the actuating element 15 has a forwardly directed projection 19 fixed thereto and extending at an angle from the plane occupied by the plate 15 in the manner indicated in FIGS. 2–5. This projection 19 serves to support the lower end of a compression spring 20 whose other end engages a lug 21 which extends through the opening 17 and which forms part of a support element 22 which acts as an intermediate transmission element. This support element 22 carries a pair of pivot pins 23a and 23b which are in turn fixedly connected with a return means formed by a plate 24 which is situated in a passage formed between the plates 3 and 8. This latter passage 25 is particularly apparent in FIGS. 2 and 4. The thickness of the plate which forms the return means 24 and its clearance in the passage 25 are so interrelated that the plate 24 is lightly braked within the passage 25 during movement therein. If desired a special adjusting device can be provided which permits the degree of braking to be determined.

Figure 5:
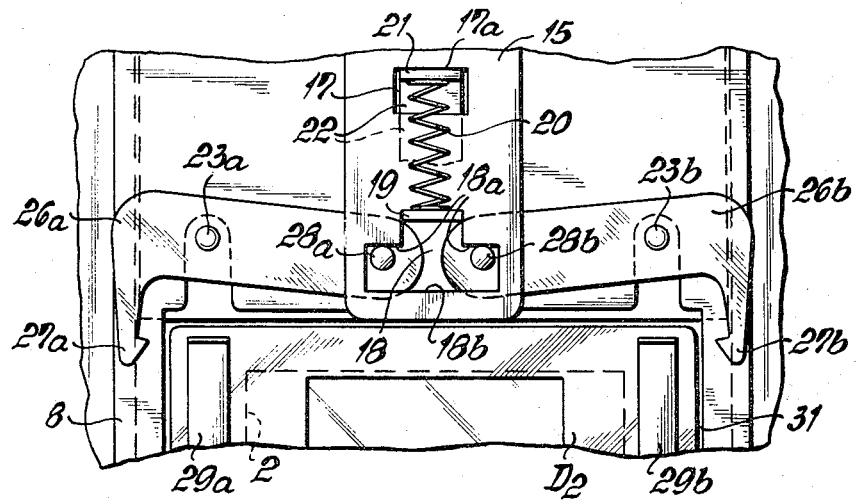
FIG. 5 is a front elevation of the lower part of the transporting means of the invention as it appears when looking at this structure from the right of FIG. 4, so that the parts are shown in FIG. 5 in the position they take when releasing a slide for movement into the projection plane.
Figure 3:
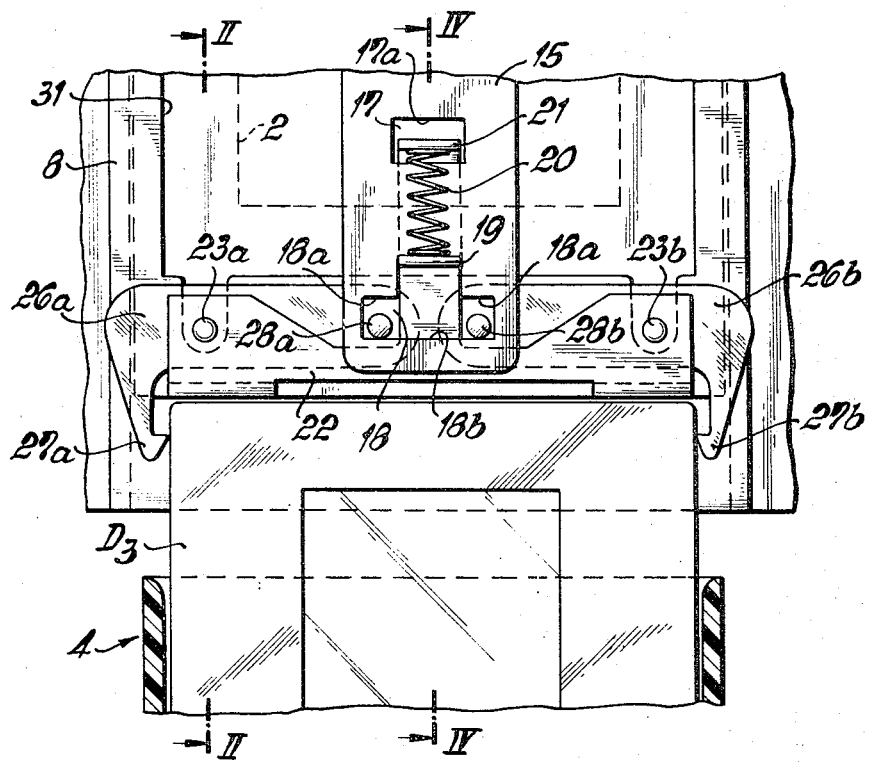
FIG. 3 is a front elevation of the lower part of the transporting means of the invention which transports the slides out of the magazine, and the structure of FIG. 3 is shown as it appears when looking at the structure from the right of FIG. 2.

The pair of pivot pins 23a and 23b, which interconnect the support elements 22 and the return means 24 with each other, serve in addition, as is particularly apparent from FIGS. 3 and 5, to pivotally support ball crank levers 26a and 26b which are provided at their free ends with gripping teeth 27a and 27b, respectively, and which respectively fixedly carry pins 28a and 28b at their opposite ends. These levers 26a and 26b form a pair of gripping levers. The pins 28a and 28b extend through the window or opening 18 of the actuating element 15, as is particularly indicated in FIGS. 1, 2 and 4. Inasmuch as the compressed spring 20 seeks to move the actuating element 15 downwardly with respect to the support element 22 into the positions indicated in FIGS. 1, 4 and 5, and to hold it in this position with respect to the return means 24 which is fixed to the support element 22, the lug 21 of the support element 22 is pressed against the upper edge 17a of the opening 17. In this way the parts assume a position where the pins 28a and 28b are pressed against the upper edge portions 18a of the opening 18 so as to turn the gripping levers 26a and 26b into the positions illustrated in FIG. 5. In this position the gripping teeth 27a and 27b are situated at their greatest distance apart from each other.

The gripping levers 26a and 26b maintain the latter position when, for the purpose of changing a slide, the handle 14 and the actuating element 15 are displaced from the position of FIGS. 1, 4 and 5 downwardly toward the slide-container 4. The edge 17a of the actuating element 15 then presses on the lug 21 of the support element 22 and displaces the latter together with the return means 24 connected thereto while overcoming the light braking of the return means 24 in the passage 25. The return means 24 thus comes into engagement, at its bottom edge, with the top edge of the slide D2 (FIG. 4) which is situated at the projection plane and which is maintained in the projecting position by a pair of leaf springs 29a and 29b which for the sake of clarity are only fragmentarily illustrated in FIG. 5. Thus, during its downward movement the return means 24 will shift the slide D2, overcoming the force of the leaf springs, into the wedge-shaped space 12 of the container 4. When the slide D2 is finally no longer in engagement with the return means 24 it tilts into the position occupied by the slide D1 in FIGS. 1 and 4. The parts will then take the position indicated in FIG. 2 where the downward movement of the actuating element 15 has been terminated. The return means 24, during return of a slide, introduces it into the wedge-shaped gap or space 12 with a force which is sufficient to shift the container 4 with the slides therein through an increment which locates the next slide to be projected at a position to be engaged by the transporting means.

At the same time, the gripping levers 26a and 26b, which during the above-described downward movement of the parts remain in the spread position of FIG. 5, become situated with their gripping teeth 27a and 27b in the region of the slide D3 which engages the guide means formed by the intermediate wall or plate 8. During the subsequent return movement of the actuating element 15 upwardly to its initial position, it is necessary for the braking force acting on the return means 24 in the passage 25 to be overcome. Inasmuch as this braking force is greater than the pressure exerted by the spring 20, there will be initially upward movement of the element 15 with additional compression of the spring 20 taking place while the support element 22 and the return means 24 remain stationary. After a relatively short extent of movement of the actuating element 15 upwardly from its lowermost position, the lower edge 18b of the lower opening 18 of the actuating element 15 engages the pins 28a and 28b of the gripping levers 26a and 26b, respectively, so as to turn the latter, during the continued upward movement of the actuating element 15, about their pivots 23a and 23b to such an extent that the gripping teeth 27a and 27b tightly clamp the slide D3 which is situated between these gripping teeth.

The parts are shown in this latter position in FIG. 3.

In this position further relative movement between the actuating element 15 and the support element 22 and return means 24 connected thereto is no longer possible, so that now the support element 22 and the return means 24, as well as the slide D3 which is gripped by the gripping levers 26a and 26b, participate in the further upward movement of the actuating element 15. The slide D3 therefore slides along the front face of the guide means formed by the intermediate wall 8 and arrives in the operating region of the shifting means formed by the leaf springs 29a and 29b. This shifting means, when the lower edge of the slide D3 has reached the lower edge 30 of the window 31 of the plate 8 (see FIG. 4 in particular), shifts the slide D3 at its lower edge through the window 31 until the lower edge of the slide engages the stationary plate 3.

This latter position of the slide D3 is illustrated in FIG. 6 which for the sake of clarity shows only the plates 3 and 8 with the windows 2 and 31 formed therein, the slide D3 and the spring 29b being shown in section.

At the same time the slide-changing mechanism has reached its upper end position, this position being determined by engagement of the lug 21 with the guide structure 16 (FIG. 1). Upon release of the handle 14 by the operator, the spring 20 can return the actuating element 15 into the position shown in FIGS. 1, 4 and 5 with respect to the support element 22 and the return means 24, and in this latter position the gripping levers 26a and 26b again assume their spread-apart position shown in FIG. 5 so that the slide D3 is released. The shifting means formed by the leaf springs 29a and 29b then displace the slide D3 fully into position against the front face of the stationary plate 3 which of course determines the projecting position of the slide. Thus, the slide is now in the projection position previously occupied by the slide D2 in FIG. 4. The return of the slide D3 into the container 4 takes place in the manner described above.

In order to provide for the slides, during their tilting displacement into the projection plane in front of the window 2, a certain secure support, there may be provided, in distinction to the above-described structure, an intermediate wall or plate 300 shown in FIGS. 7 and 8 formed with the projection window 200 and having a front face which determines the projection plane. This plate 300 is provided at its front face with a profiled groove 32 which receives the lower edge of the slide D4 after it passes through the window 310 formed in the guide plate 800, so that by being situated in the groove 32 the slide will be securely supported, as indicated in FIG. 7. When the slide reaches the position shown in FIG. 8, where it is in the projecting position, the lower edge of the slide D4 is displaced out of the groove 32, so that the latter does not interfere in any way with the return movement of the slide to the container.

In FIGS. 9 and 10 are shown a cover 40 and a partition-less container 4 as individual elements, respectively. As is apparent from FIG. 10, the container requires no openings or windows to be formed in its walls for the purpose of providing for entrance of the slide-changing mechanism. The illustrated wedge-shaped element 10, which preferably is formed by at least a pair of ribs, is however not absolutely essential. Especially when the side walls of the container extend only about half way through the height of the slides and when the container is not filled with slides, the slides will of themselves have a tendency to assume the illustrated inclined position in the container. In order to assure that the extent of filling of the container does not exceed the point where this inclined position will be provided, it is possible to provide the container with corresponding marks, or, as indicated in FIG. 9, there can be provided at the interior of the cover 40 rib-like inserts 41 which prevent seating of the cover 40 on the container 4 when the latter contains too many slides D.

Instead of the fixed elements 10 and 41, it is also possible to provide spring stops which, if desired, can be selectively connected to different parts of the container 4 and the cover 40 in the interior thereof, so that in the case where the container is filled with different amounts of slides the proper inclination of the slides will be provided.

The invention need not necessarily be practiced with a structure, as described above, where the slides are raised out of a container situated beneath the optical axis, but instead it is also possible to situate a container beside the optical axis and to move the slides laterally or horizontally out of the container into the projection position and then back into the container. Such a projector will appear in a plan view precisely the same as the side view for the projector of FIG. 1.

In order to augment the force acting on the container to shift the latter, a spring device can be provided which acts on the container so that the next slide which is to be projected is pressed against the plate 8. The gripping levers 26a and 26b can be made partly or entirely of elastic material, so that they will engage and hold the slides securely. This latter action can be augmented by giving the slides themselves a suitable construction, as shown for the slides D5 and D6 in FIGS. 11 and 12. Thus, the slides can either be provided at their frames with openings 33 (FIG. 11) or with notches 34 (FIG. 12) to enhance the gripping of the slides by the teeth 27a and 27b.

What is claimed is:

1. In a photographic slide projector for projecting images from slides which are situated one directly next to and in engagement with the other in a container which is open at one side, a projection plane in which the slides are to be successively situated for projection of images therefrom, transporting means situated in advance of said projection plane for engaging and transporting a slide along a path situated in advance of said projection plane to a location where the slide is properly positioned with respect to the optical axis but is situated along said optical axis in advance of said projection plane, shifting means engaging a slide at said location for shifting the slide from said transporting means along the optical axis into said projection plane so that an image can then be projected from said slide, and return means engaging a slide in said plane and returning it to the container while maintaining the slide in said projection plane during return movement of the slide into the container.

2. The combination of claim 1 and wherein said transporting means includes gripping elements which grip a slide during transportation thereof along said path to said location and which release the slide when the latter has reached said location.

3. The combination of claim 1 and wherein a stationary guide means is situated between said projection plane and said path along which the slides are successively moved by said transporting means for guiding the slides for movement along said path while each slide engages a face of said guide means which is directed away from said projection plane, said guide means being formed with an opening through which the optical axis passes and through which said shifting means shifts a slide during movement thereof into said projection plane, said guide means having a face directed toward said projection plane and guiding a slide during return movement thereof by said return means, and said guide means extending into said container and having a portion situated between a slide which is about to be projected and a slide which has already been projected, so that said portion of said guide means acts as a stop for determining the successive locations of the successive slides during movement thereof to the projection plane.

4. The combination of claim 3 and wherein a stationary plate has a face spaced from and directed toward said guide means and said face of said stationary plate determining the projection plane, said face of said stationary plate and said face of said guide means which is directed toward said projection plane defining between themselves a return passage for the slides, and said return means moving in said return passage to displace a slide back into said container.

5. The combination of claim 1 and wherein said shifting means includes at least one spring element situated in the path along which a slide is moved by said transporting means to said location so that said spring element will engage a slide at said location and act resiliently on the slide to shift it along the optical axis into the projection plane.

6. The combination of claim 1 and wherein said transporting means includes an actuating element for actuating said transporting means, gripping elements for gripping a slide, and a support for said gripping elements supporting the latter and coupled to said actuating element through said gripping elements.

7. The combination of claim 6 and wherein movement of said support element with said actuating element is retarded.

8. The combination of claim 1 and wherein a stationary guide means has one face directed away from said projection plane for guiding each slide during movement along said path to said location, said guide means being formed with an opening through which the optical axis passes and through which said shifting means shifts a slide when the latter has been transported to said location, and said guide means having an opposed face directed toward said projection plane for guiding each slide during its return movement by said return means into the container, a stationary plate having a face spaced from and directed toward said opposed face of said guide means, said face of said stationary plate determining said projection plane and defining with said opposed face of said guide means a passage in which each slide is returned to the container and in which said return means moves, said transporting means including an actuating element, gripping levers for gripping each slide and situated at the side of said guide means opposite from said stationary plate, a support element extending through said opening of said guide means and carrying pivot pins on which said levers are supported for turning movement, said actuating element being formed with an opening and said levers respectively carrying actuating pins received in said latter opening for coupling said support element to said actuating element, and said support element being connected with said return means, said return means frictionally engaging at least one of the faces which define the passage through which a slide moves during return to said container for retarding movement of said support element with said actuating element.

9. The combination of claim 8 and wherein the thickness of said return means and its clearance in said passage determine the extent of frictional retarding of movement of said return means in said passage.

10. The combination of claim 8 and wherein said support element and actuating element are movable one relative to the other, and said transporting means including a spring engaging said support element and actuating element for urging them with respect to each other to locations where said gripping levers are in an open position releasing a slide.

11. The combination of claim 1 and wherein said transporting means moves vertically, and a guide for the slide container, said guide extending downwardly and rearwardly for supporting the slide container in a position inclined downwardly from the front toward the rear of the projector.

12. The combination of claim 1 and wherein said transporting means moves horizontally and wherein a guide means guides the slide container for movement along a path which diverges away from the optical axis.

13. The combination of claim 1 and wherein a guide means guides the slide container for movement along a path which is inclined with respect to the optical axis, and said container having in its interior at one end thereof a stop element engaging the last of a series of slides and maintaining all of the slides at an inclination with respect to the container guide means which will situate the slides in planes perpendicular to the optical axis prior to projection of the slides.

14. The combination of claim 1 and wherein said transporting means includes slide gripping elements which are at least partly elastic.

15. The combination of claim 1 and wherein each slide which is about to be engaged by the transporting means to be transported to said location defines with a slide which has just been returned to the container from the projection plane a gap of wedge-shaped configuration for receiving the slide which at any given instant is in the projection plane and is about to be returned to the container.

16. The combination of claim 15 and wherein said return means, during return of a slide introduces it into said gap with a force sufficient to shift the container with the slides therein through an increment which locates the next slide to be projected at a position to be engaged by the transporting means.

References Cited

UNITED STATES PATENTS

| | | | |
|---|---|---|---|
| 1,522,284 | 1/1925 | Chamberlain | 88—28 |
| 2,213,779 | 9/1940 | Young | 88—28 |
| 2,533,441 | 12/1950 | Estes | 88—28 |
| 2,593,007 | 4/1952 | Cadwell et al. | 88—28 |
| 2,922,334 | 1/1960 | Krull | 88—28 |

NORTON ANSHER, *Primary Examiner.*

WYNDHAM M. FRYE, *Assistant Examiner.*